United States Patent
Yu et al.

(10) Patent No.: US 9,626,694 B2
(45) Date of Patent: *Apr. 18, 2017

(54) METHODS, COMPUTER PROGRAM PRODUCTS, AND APPARATUS FOR RECEIVING TARGETED CONTENT BASED ON LOCALLY STORED USER DATA

(71) Applicant: AT&T Intellectual Property I, L. P., Atlanta, GA (US)

(72) Inventors: Ke Yu, Alpharetta, GA (US); William Brown, Woodstock, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,213

(22) Filed: Oct. 7, 2014

(65) Prior Publication Data

US 2015/0025965 A1 Jan. 22, 2015

Related U.S. Application Data

(63) Continuation of application No. 12/198,417, filed on Aug. 26, 2008, now Pat. No. 8,869,193.

(51) Int. Cl.
*H04N 7/10* (2006.01)
*H04N 7/025* (2006.01)
(Continued)

(52) U.S. Cl.
CPC ..... *G06Q 30/0251* (2013.01); *G06Q 30/0273* (2013.01); *H04N 7/17318* (2013.01); *H04N 21/25891* (2013.01); *H04N 21/4312* (2013.01); *H04N 21/4314* (2013.01); *H04N 21/4331* (2013.01); *H04N 21/44008* (2013.01); *H04N 21/44016* (2013.01); *H04N 21/44213* (2013.01); *H04N 21/4532* (2013.01); *H04N 21/6582* (2013.01); *H04N 21/812* (2013.01)

(58) Field of Classification Search
USPC .................................. 725/32, 34–36
See application file for complete search history.

(56) References Cited

U.S. PATENT DOCUMENTS

| | | | |
|---|---|---|---|
| 7,168,084 B1 * | 1/2007 | Hendricks | H04H 20/10 348/E5.002 |
| 7,720,432 B1 | 5/2010 | Colby et al. | |

(Continued)

OTHER PUBLICATIONS

Final Office Action for U.S. Appl. No. 12/198,417 dated Dec. 11, 2012, 10 pages.

*Primary Examiner* — Nasser Goodarzi
*Assistant Examiner* — Fred Peng
(74) *Attorney, Agent, or Firm* — Cantor Colburn LLP

(57) ABSTRACT

Targeted content is delivered to and received by at least one user device based on user information stored locally at the user device. Program content and targeted content are received. The targeted content received is associated with user information stored locally on the user device, while the program content is broadcast to multiple users. A determination by a scanning process is made at what position or at what time in the program content to include the targeted content. The program content and the targeted content are rendered, with the targeted content included at the determined position or time in the program content, for presentation to the user.

12 Claims, 4 Drawing Sheets

(51) Int. Cl.

| | |
|---|---|
| *G06Q 30/02* | (2012.01) |
| *H04N 7/173* | (2011.01) |
| *H04N 21/258* | (2011.01) |
| *H04N 21/431* | (2011.01) |
| *H04N 21/433* | (2011.01) |
| *H04N 21/44* | (2011.01) |
| *H04N 21/442* | (2011.01) |
| *H04N 21/45* | (2011.01) |
| *H04N 21/658* | (2011.01) |
| *H04N 21/81* | (2011.01) |

(56) References Cited

U.S. PATENT DOCUMENTS

| | | | |
|---|---|---|---|
| 8,260,665 | B2 | 9/2012 | Foladare et al. |
| 8,850,473 | B2 * | 9/2014 | Sheehan ............ H04N 21/2221 705/14.4 |
| 8,869,193 | B2 * | 10/2014 | Yu ...................... H04N 7/17318 705/14.49 |
| 2004/0158858 | A1 | 8/2004 | Paxton et al. |
| 2005/0246282 | A1 * | 11/2005 | Naslund et al. ................. 705/52 |
| 2007/0157231 | A1 * | 7/2007 | Eldering et al. ................. 725/35 |
| 2008/0201734 | A1 | 8/2008 | Lyon et al. |
| 2008/0250448 | A1 | 10/2008 | Rowe et al. |
| 2008/0263583 | A1 | 10/2008 | Heath |
| 2008/0276270 | A1 | 11/2008 | Kotaru et al. |
| 2008/0320531 | A1 | 12/2008 | Kim et al. |
| 2009/0007171 | A1 * | 1/2009 | Casey .................... G06Q 30/02 725/34 |
| 2009/0282433 | A1 | 11/2009 | Petta et al. |
| 2010/0175080 | A1 | 7/2010 | Yuen et al. |
| 2010/0306249 | A1 | 12/2010 | Hill et al. |
| 2011/0047567 | A1 | 2/2011 | Zigmond et al. |
| 2014/0115636 | A1 * | 4/2014 | Stuckman ....................... 725/53 |

\* cited by examiner

METHODS, COMPUTER PROGRAM PRODUCTS, AND APPARATUS FOR RECEIVING TARGETED CONTENT BASED ON LOCALLY STORED USER DATA

CROSS-REFERENCE TO RELATED APPLICATIONS AND PRIORITY CLAIM

This application is a continuation of U.S. Non-Provisional Application Ser. No. 12/198,417, entitled "METHODS, COMPUTER PROGRAM PRODUCTS, AND APPARATUS FOR RECEIVING TARGETED CONTENT BASED ON LOCALLY STORED USER DATA", filed Aug. 26, 2008, which is incorporated herein by reference in its entirety.

BACKGROUND

Exemplary embodiments relate generally to content delivery, and, in particular, to delivery and receipt of targeted content.

In advertising, it is considered highly desirable to target advertisements and other promotional offers to specific users/consumers rather than to broadcast advertisements to a general audience. By targeting advertising to individual users, the likelihood may be increased that a user will view and act upon the advertisement. Unfortunately, obtaining information sufficient to target advertising has proven to be difficult.

With the advent of Internet Protocol Television (IPTV), targeted advertising has become increasingly attractive. IPTV is a digital television delivery service in which a digital television signal is delivered to users via a computer network infrastructure using the Internet Protocol. Typically, IPTV services are bundled with additional Internet services, such as Internet web access and voice over Internet protocol (VOIP). An IPTV user typically has a set top box connected to (or incorporated within) his or her television for the reception of a digital signal. Used in conjunction with an IP-based platform, a set top box allows for a user to access an IPTV service and any additional services that are integrated within the IPTV service. IPTV service platforms allow for an increase in the interactive services that can be provided to users. As such, a user can have access to a wide variety of content that is available via the IPTV service or the Internet, including content, such as advertising, tailored specifically for the user. A major challenge in making such content available is to target the content to the user based on the user's preferences without compromising privacy of the user's information or consuming large amounts of network bandwidth.

BRIEF SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter. This description provides tools and techniques for delivering targeted content to users based on locally stored user. According to various embodiments described herein, targeted content is delivered to at least one user based on user information stored locally at the user device. Program content is broadcast to multiple users, while targeted content is received by a certain user based on the user information stored locally at the user's device. A determination is made at what position or at what time in the program content to include the targeted content. The program content and the targeted content are rendered, with the targeted content included at the determined position or time in the program content, for presentation to the user.

Other methods, computer program products, and or devices according to embodiments will be or become apparent to one with skill in the art upon review of the following drawings and Detailed Description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The Detailed Description explains various exemplary embodiments, together with advantages and features, by way of example with reference to the drawings.

DETAILED DESCRIPTION OF EXEMPLARY EMBODIMENTS

One or more exemplary embodiments are described below in detail. The disclosed embodiments are intended to be illustrative only, since numerous modifications and variations therein will be apparent to those of ordinary skill in the art.

According to exemplary embodiments, targeted content is received by at least one individual user device based on user information stored locally in the user device. Storing the user data locally preserves network bandwidth and preserves privacy of the user information. Also, programs may be broadcast to multiple users, while those same users may receive different targeted content based on the user information stored at their devices. This further preserves network bandwidth because programs with targeted content do not have to be unicast to each user.

In the description that follows, the terms advertisement, ad, and targeted content are used interchangeably to represent targeted content. Such targeted content is not limited to an advertisement but may include other content, such as a notice, webpage content, a logo, an offer, an alert, etc. Further, such content may be video, audio, or a combination of both. Thus, according to exemplary embodiments, the rendering of targeted content in program content described below includes not only preparing video data for display but also preparing audio, video, and audio/video data.

Figure 1:
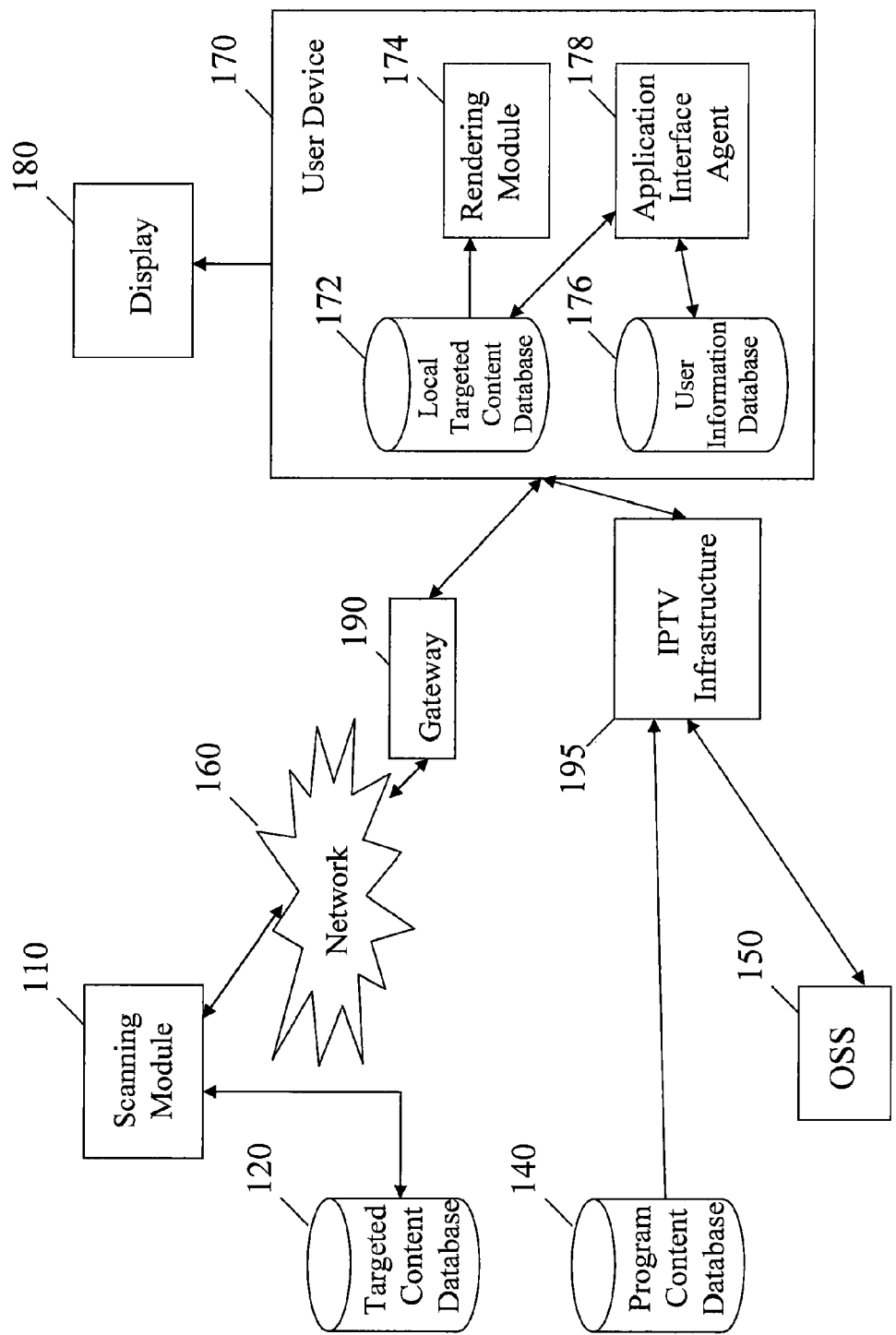
FIG. 1 is an illustration of a communication environment in which targeted content may be received by at least one user device in accordance with exemplary embodiments.

FIG. 1 shows a communication environment in which targeted content is received by at least one user device according to an exemplary embodiment. The environment shown in FIG. 1 is an IPTV environment. However, it should be appreciated that targeted content may be delivered in a similar manner as described herein in other environments, e.g., broadband cable environments and cellular environments.

In an IPTV environment, such as that shown in FIG. 1, an IPTV gateway 190 serves as a conduit for data that that is received from and transmitted to one or more networks outside of the IPTV environment, such as a network 160. The network 160 may include one or more networks suitable for delivery of content to the IPTV gateway 190, such as a cable network, a cellular network, or the Internet. As those skilled in the art will appreciate, the IPTV environment may also comprise an IPTV infrastructure 195 in communication with a user device 170 and the gateway 190. The user device 170 may include a set top box or any other type of suitable communication device for receiving targeted content, such as a cellular telephone, a personal digital assistant, a personal computer or other device connected via wireline or wireless connections to a network for receiving program content and targeted content.

For an IPTV environment, such as that shown by example in FIG. 1, media content may be managed and delivered to a plurality of user communication devices, such as the user device 170. Management of content delivery may be performed by an Operations Support System (OSS) 150. The OSS 150 is a backend operation support system. According to exemplary embodiments, for services such as IPTV, the OSS 150 plays a vital role in maintaining and administering network control, including provisioning, blackout management, video recording, subscriber management, and notification.

According to exemplary embodiments, various communication and transmission protocols may be implemented to accomplish wired (e.g., telephonic communication, cable communication, and power line communication) and wireless (e.g., Bluetooth, WiFi, Ultra-wideband, and satellite transmission) communication and data transmission between the user device 170 and the IPTV infrastructure 195.

When a user accesses the IPTV environment, the device user may log into the IPTV infrastructure 195 via a user interface (UI) that may be displayed at a display 180 connected to or incorporated within the user device 170.

User information, including demographic information and application activity usage may be captured and stored locally in a user information database 176. For example, the user information may include viewing patterns (e.g., what actors a user likes to see and what programs a user likes to see) and interactive programming guide/electronic programming guide (IPG)/(EPG) data. The user information stored in the user information database 176 may also include other user-related information, including, e.g., address, zip-code, city, and income level.

A scanning module 110 is in communication with a targeted content database 120 containing content to be sent to targeted users based on user information stored locally in user communication devices, such as the user device 170. The scanning module 110 communicates with the user device 170 containing user information stored in the user information database 176. According to exemplary embodiments, this communication occurs via the network 160 and an application interface agent 178. In an IPTV environment, the communication further passes through the gateway 190 and the IPTV infrastructure 195.

According to an exemplary embodiment, with the aid of the application interface agent 178, the scanning module 110 looks for certain demographic and other user-related information stored in the local user information database 176 in the user device 170. Certain user data is associated or deemed relevant enough to certain ads and other targeted content such that an advertiser or other targeted content provider would find it worthwhile to deliver certain targeted content to a user. For example, an advertisement for pick-up trucks may be targeted to users in a rural environment, while advertisements for small cars may be targeted to users in a city environment.

According to an exemplary embodiment, the scanning module 110 polls the user device 170 to obtain demographic and other user-related information. The scanning module 110 may contain rules for matching data stored in the user database 176 with user data associated with targeted ads and other targeted content stored in the targeted content database 120. This polling and matching may be performed at any time, e.g., on a periodic basis, late at night or during non-peak hour (so as not to adversely impact available network bandwidth). If the demographic or other user-related information obtained from the local user information database 176 matches the user information associated with the advertisement (or other targeted content) stored in the targeted content database 120, the advertisement or other targeted content may be "pushed" from the targeted content database 120 to the application interface agent 178 via the scanning module 110, the network 160, and the IPTV gateway and infrastructure 190, 195, if appropriate. The application interface agent 178, in turn, delivers the ads or other targeted content to a local targeted content database 172, where this information is stored locally in the user device 170.

Program content is also delivered to the user device 170 from a program content database 140 via the network 160 and the IPTV gateway 190 and IPTV infrastructure 195, if appropriate. This program content may be broadcast not only to the user device 170 but also to multiple other devices. According to an exemplary embodiment, the program content is delivered to the application interface agent 178 which, in turn, stores the program content in the local database 172.

According to an exemplary embodiment, a rendering module 174 included in the user device 170 determines what program content to present to the display 180 and when/where during the program content to insert or overlay targeted content.

For example, the local targeted content database 172 may store a logo for a tennis shoe brand, such as the NIKE "swish". The logo may then be inserted by the rendering module 174 during a sports program, such as a basketball tournament. The information indicating when/where to insert or overlay the ad may be part of the ad metadata that may be stored in the local targeted content database 172. The rendering module 174 may determine where/when to insert the ad based on the ad metadata. A graphics processor may be included in the rendering application for rendering an advertisement onto/in a program. The program with the ad overlaid or inserted is delivered to the display unit 180, which may be integrated into the same device as the user device 170 or be a separate device. The program with the inserted or overlaid ad is displayed to the user.

Although the display 180 is shown in FIG. 1 for simplicity of illustration, it should be appreciated that the targeted content may be "rendered" to another type of device, e.g., played to an audio device, such as a speaker.

According to some embodiments, a determination may be made by the rendering module 174 at what position during a program to insert targeted content. For example, a determination may be made when a network logo disappears in a program. This is the point during the program during which a broadcast advertisement may typically be shown. The targeted content may be inserted at this point in the program, replacing the broadcast advertisement. This is described in more detail below with reference to FIG. 3B.

According to other embodiments, the targeted content may be inserted or overlaid during the program at a particular time, whenever the program is playing, or during a certain time period during the program. This insertion may be based on time codes included in the program content, as explained in further detail below with reference to FIG. 3C.

The application interface agent 178 may report to the scanning module 110 that an ad or other targeted content was inserted or overlaid during a program. This may be performed by a reporting module included in the rendering module 174 or in a separate module. Advertisers and other targeted content providers may be charged for advertising based on the reported data. For example, the advertisers/targeted content providers may be charged a flat rate or charged for each time an ad is inserted. To maintain user privacy, the reporting module may perform "generic reporting", i.e., report what program the ad or targeted content was included in but not report what advertisement or specific targeted content was inserted. There may be varying levels of privacy involved in reporting. For example, reports may indicate when during a program an ad/targeted content is included, where in the program the ad/targeted content is included or both.

Figure 2:
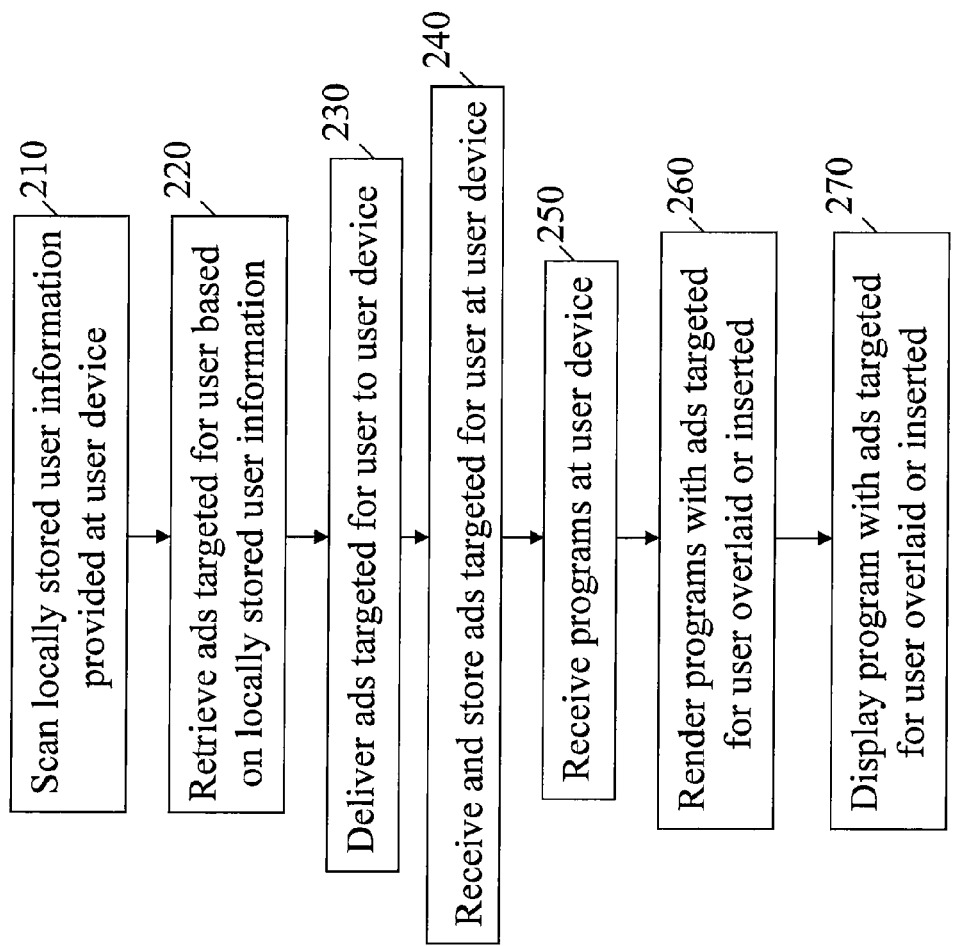
FIG. 2 is a flow diagram illustrating a process for delivering, receiving, and rendering targeted content with program content in accordance with exemplary embodiments.

FIG. 2 illustrates a method for delivering targeted content to at least one user according to an exemplary embodiment. At step 210, locally stored user information in the database 176 in the user device 170 is scanned or polled by the scanning module 110. The scanning module 110 looks for certain information stored in the database 176 that matches specific user information associated with certain ads and/or other targeted content stored in the targeted content database 120. The scanning module 110 retrieves ads and/or other targeted content from the targeted content database 120 at step 220. The ads and/or other targeted content retrieved are those with associated user information matching the user information stored in the user information database 176. At step 230, the scanning module 110 delivers the ads/targeted content to the user device 170. At step 240, the user device 170 receives and stores the ads/targeted content. The ads/targeted content may be received by the application interface agent 178 that, in turn, delivers the ads/targeted content to the local targeted content database 172. At step 250, program content from the program content database 140 is received at the user device 170. The program content may also be delivered to the application interface agent 178 and then stored locally in the database 172 or some other database. At step 260, the rendering module 174 renders the program content with the targeted content included for presentation by the display 180 (or other appropriate device). This rendering is accomplished by determining what programs to present to the display 170 and when/where during the program to include the targeted content. At step 270, the program with the included ad/targeted content is displayed (or presented in some other appropriate manner, e.g., as an audio signal) to the user. It should be appreciated that the order of steps shown in FIG. 2 is one example of how targeted content may be delivered, received, and rendered. For example, programs may be received and stored at the user device before targeted content is received. The program may be played back at a later time with the targeted content included.

Figure 3:
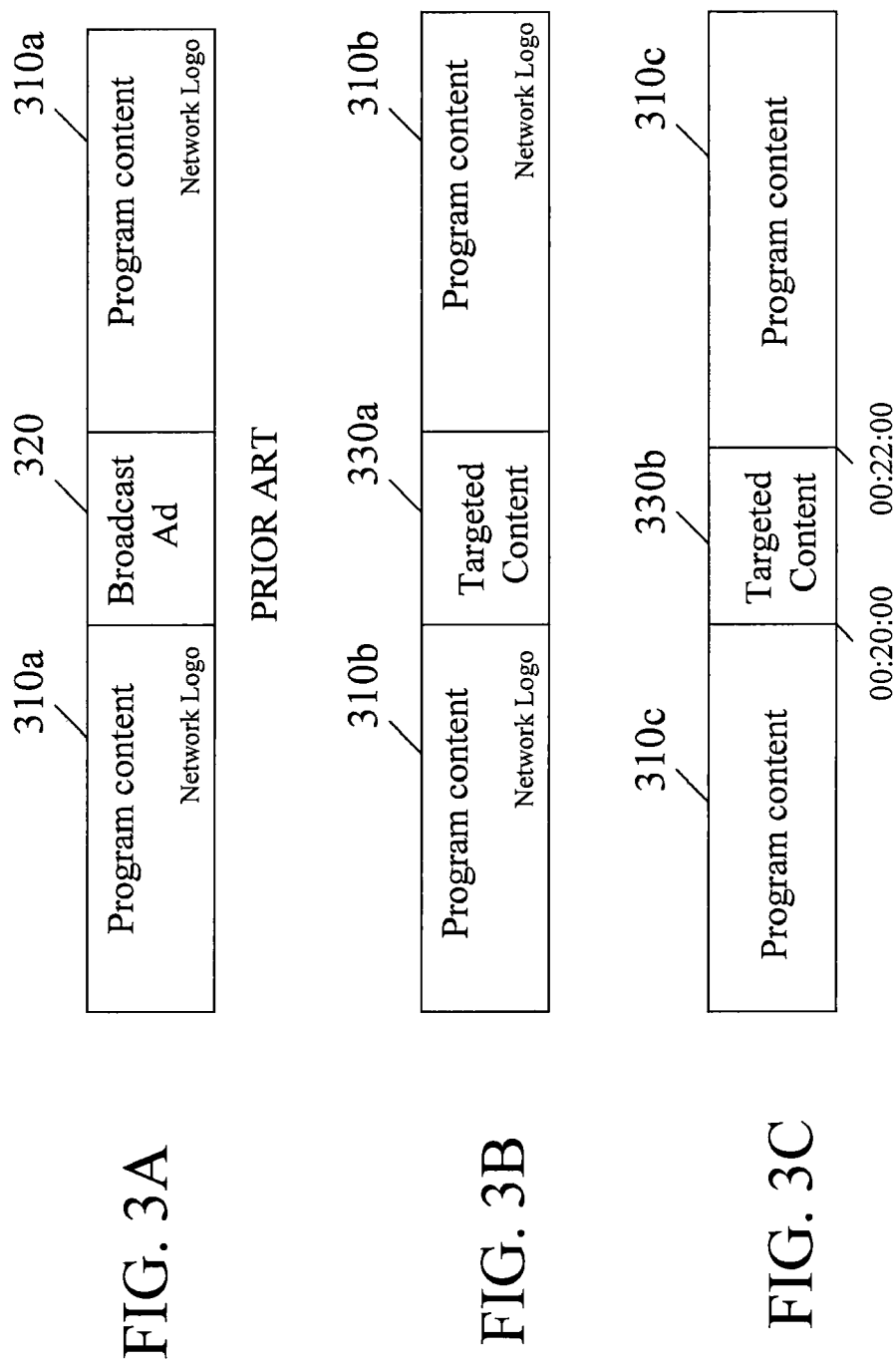
FIG. 3A illustrates an example of how broadcast advertisements have traditionally been included in program content according to an exemplary embodiment.
FIGS. 3B and 3C illustrate examples of how targeted content may be included in program content according to exemplary embodiments.

FIG. 3A illustrates how advertisements were traditionally inserted in program content. As can be seen from FIG. 3A, program content 310a often includes a network logo. Traditionally, when the network logo disappears, this is an indication that there is a "commercial break" during which time an ad may be inserted. Accordingly, a broadcast ad 320 is traditionally inserted and broadcast to the same users as the program content. Upon completion of broadcasting the ad, the program content 310a reappears with the network logo.

According to an exemplary embodiment, targeted content may be inserted into the program content in a similar manner when a network logo disappears. For example, as shown in FIG. 3B, when the network logo no longer appears in program content 310b, indicating a break in the program content, targeted content 330a may be included and displayed to the user.

According to another embodiment, the targeted content may be inserted based on time codes included in the program content. For example, referring to FIG. 3C, program content 310c includes time codes indicating, on a timed basis, points in the program. As those skilled in the art will appreciate, time codes may be expressed in several forms, such as hours, minutes, and seconds. At a certain time during the program, represented in FIG. 3C by time code 00:20:00, a break in the program occurs. At this point, targeted content 330b may be included. After a time allotted for the targeted content 330b, which may be an ad or other targeted content, has elapsed, represented in FIG. 3C by another time code 00:22:00, the program content 310c resumes.

It should be appreciated that there may be other ways of including targeted content in program content, and the examples shown in FIG. 3B and FIG. 3C are for illustrative purposes only. As another example, the targeted content may be inserted at certain times during a given day, e.g., near mealtime, or at times during which the program is scheduled to be shown.

Figure 4:
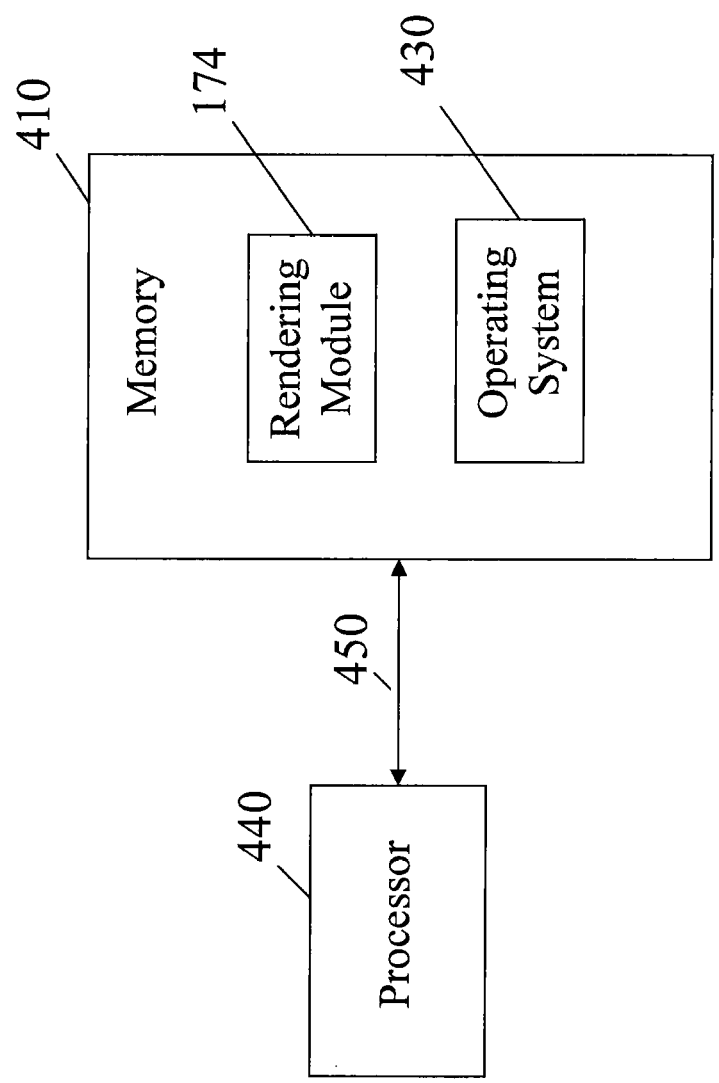
FIG. 4 is a block diagram illustrating a processor and a memory for rendering targeted content included in program content for display according to an exemplary embodiment.

FIG. 4 illustrates a processor and a memory hosted by a device, such as the user device 170 shown in FIG. 1. A processor 440 and memory 410 may be used according to exemplary embodiments for rendering advertisements and other targeted content along with program content for display (or other appropriate presentation). The processor 440 communicates with the memory 410 via, e.g., an address bus 450. The processor 440 may, for example, be a commercially available or customized microprocessor. The memory 410 is representative of the overall hierarchy of memory devices containing computer readable media and data used to execute operations for determining how targeted content is rendered into program content. The memory 410 may also contain other memory devices containing computer readable media and data used for other functions described above with regard to the user device 170, such as storage of targeted content and user information. Thus, for example, the memory 410 may include one or more of the various components of the user device 170, such as the rendering module 174, the local targeted content database 172, the application interface agent 178, and the user information database 176.

For simplicity of illustration, the memory 410 is shown as including only the rendering module 174 depicted as part of the user device 170 in FIG. 1. The memory 410 may also include an operating system 430 that controls operation of the user device 170 and manages the device's resources and may coordinate execution of various programs by the processor 440. The various processes performed by the rendering module 174 and other components of the user device 170 may be included as computer readable instructions executable by the processor. The memory 410 may include, but is not limited to, devices such as cache, ROM, PROM, EPROM, EEPROM, flash, SRAM and DRAM.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A method for providing targeted content for advertising on a user device, the method comprising:
    receiving, by the user device, program content and the targeted content for presentation on the user device, the targeted content to be included at a position in the program content;
    determining the position in the program content to overlay the targeted content, the determining comprising identifying a portion of the program content containing advertising content and replacing the advertising content with the targeted content;
    reporting, by the user device to a scanning module via a network, occasions in which the targeted content was included into the program content, in order to associate charges to an advertiser for the targeted content; and
    to report the occasions, performing, by the user device to the scanning module via the network, generic reporting of the program content inserted with the targeted content without reporting the targeted content itself according to a level of privacy in reporting the occasions, the generic reporting further including reporting when the targeted content was included during the program content and reporting where the targeted content was included in the program content according to the level of privacy while not reporting the targeted content itself;
    wherein the generic reporting of the program content inserted with the targeted content without reporting the targeted content itself comprises the user device failing to send the targeted content to the scanning module via the network;
    wherein determining at what time to overlay the targeted content on the program content which includes determining when the program content is playing during which to overlay the targeted content; wherein the user device further stores the program content and the targeted content; and wherein the user device is a cellular phone and the network is a cellular network.

2. The method of claim 1, wherein the targeted content is overlaid on the program content.

3. The method of claim 1, wherein the user device is a set top box.

4. The method of claim 1, wherein the targeted content includes webpage content.

5. A computer program product, tangibly embodied on a non-transitory computer readable medium, for providing targeted content for advertising, the computer program product including computer-executable instructions that, when executed by a user device, cause the user device to perform operations comprising:
    receiving, by the user device, program content and the targeted content for presentation on the user device, the targeted content to be included at a position in the program content;
    determining the position in the program content to overlay the targeted content, the determining comprising identifying a portion of the program content containing advertising content and replacing the advertising content with the targeted content;
    reporting, by the user device to a scanning module via a network, occasions in which the targeted content was included into the program content, in order to associate charges to an advertiser for the targeted content; and
    to report the occasions, performing, by the user device to the scanning module via the network, generic reporting of the program content inserted with the targeted content without reporting the targeted content itself according to a level of privacy in reporting the occasions, the generic reporting further including reporting when the targeted content was included during the program content and reporting where the targeted content was included in the program content according to the level of privacy while not reporting the targeted content itself;
    wherein the generic reporting of the program content inserted with the targeted content without reporting the targeted content itself comprises the user device failing to send the targeted content to a-the scanning module via the network;
    wherein determining at what time to overlay the targeted content on the program content which includes determining when the program content is playing during which to overlay the targeted content; wherein the user device further stores the program content and the targeted content; and wherein the user device is a cellular phone and the network is a cellular network.

6. The computer program product of claim 5, wherein the targeted content is overlaid on the program content.

7. The computer program product of claim 5, wherein the user device is a set top box.

8. The computer program product of claim 5, wherein the targeted content includes webpage content.

9. An apparatus for providing targeted content for advertising, the apparatus comprising:
    a processor; and
    a non-transitory computer readable medium with computer-executable instructions that, when executed by the processor, cause the processor to perform operations comprising:
    receiving program content and the targeted content for presentation by the processor, the targeted content to be included at a position in the program content;
    determining the position in the program content to overlay the targeted content, the content and replacing the advertising content with the targeted content;
    reporting, by the processor to a scanning module via a network, occasions in which the targeted content was included into the program content, in order to associate charges to an advertiser for the targeted content; and to report the occasions, performing, by the processor, generic reporting of the program content inserted with the targeted content without reporting the targeted content itself according to a level of privacy in reporting the occasions, the generic reporting further including reporting when the targeted content was included during the program content and reporting where the targeted content was included in the program content according to the level of privacy while not reporting the targeted content;

wherein the generic reporting of the program content inserted with the targeted content without reporting the targeted content itself comprises the processor failing to send the targeted content to the scanning module via the network;

wherein determining at what time to overlay the targeted content on the program content which includes determining when the program content is playing during which to overlay the targeted content; wherein the user device further stores the program content and the targeted content; and wherein the user device is a cellular phone and the network is a cellular network.

10. The apparatus of claim 9, wherein the targeted content is overlaid on the program content.

11. The apparatus of claim 9, wherein the apparatus is a set top box.

12. The apparatus of claim 9, wherein the targeted content includes webpage content.

* * * * *